(No Model.) 4 Sheets—Sheet 1.

J. W. HYATT.
APPARATUS FOR FILTERING.

No. 293,750. Patented Feb. 19, 1884.

WITNESSES:
Herman Gustow
William D. Ellison

INVENTOR
John W. Hyatt
BY Chas. B. Gill
ATTORNEY (No Model.) 4 Sheets—Sheet 2.

J. W. HYATT.
APPARATUS FOR FILTERING.

No. 293,750. Patented Feb. 19, 1884.

WITNESSES:
Herman Gustow
William B. Ellison

INVENTOR
John W. Hyatt
BY Chas. R. Gill
ATTORNEY (No Model.) 4 Sheets—Sheet 3.

J. W. HYATT.
APPARATUS FOR FILTERING.

No. 293,750. Patented Feb. 19, 1884.

WITNESSES:
Herman Gustow
William B. Ellison

INVENTOR
John W. Hyatt,
BY
Chas. O. Gill
ATTORNEY

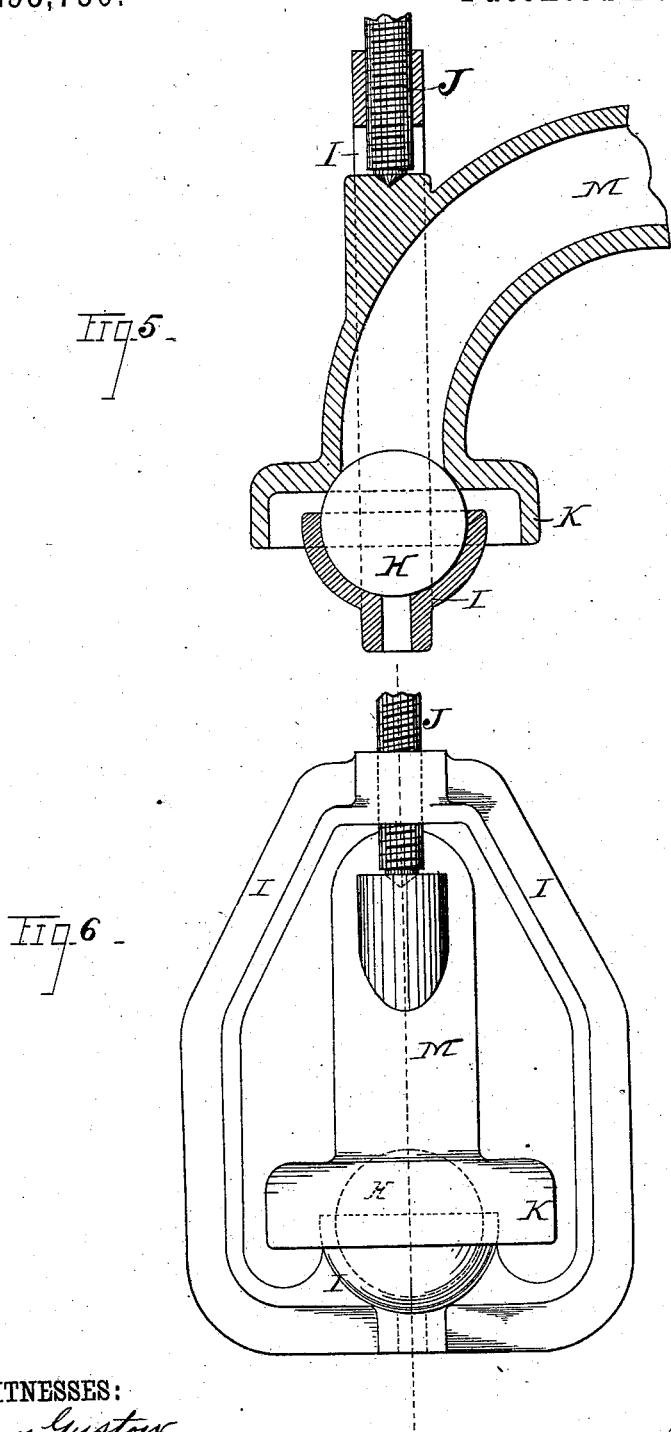

UNITED STATES PATENT OFFICE.

JOHN W. HYATT, OF NEWARK, NEW JERSEY.

APPARATUS FOR FILTERING.

SPECIFICATION forming part of Letters Patent No. 293,750, dated February 19, 1884.

Application filed August 1, 1883. (No model.)

*To all whom it may concern:*

Be it known that I, JOHN W. HYATT, a citizen of the United States, and a resident of Newark, in the county of Essex and State of New Jersey, have invented certain new and useful Improvements in Apparatus for Filtering, of which the following is a specification.

The invention relates to improvements in apparatus for filtering.

The exact nature and operation of the invention will be clearly pointed out in the detailed description hereinafter presented, reference being had to the accompanying drawings, in which—

Figure 1:
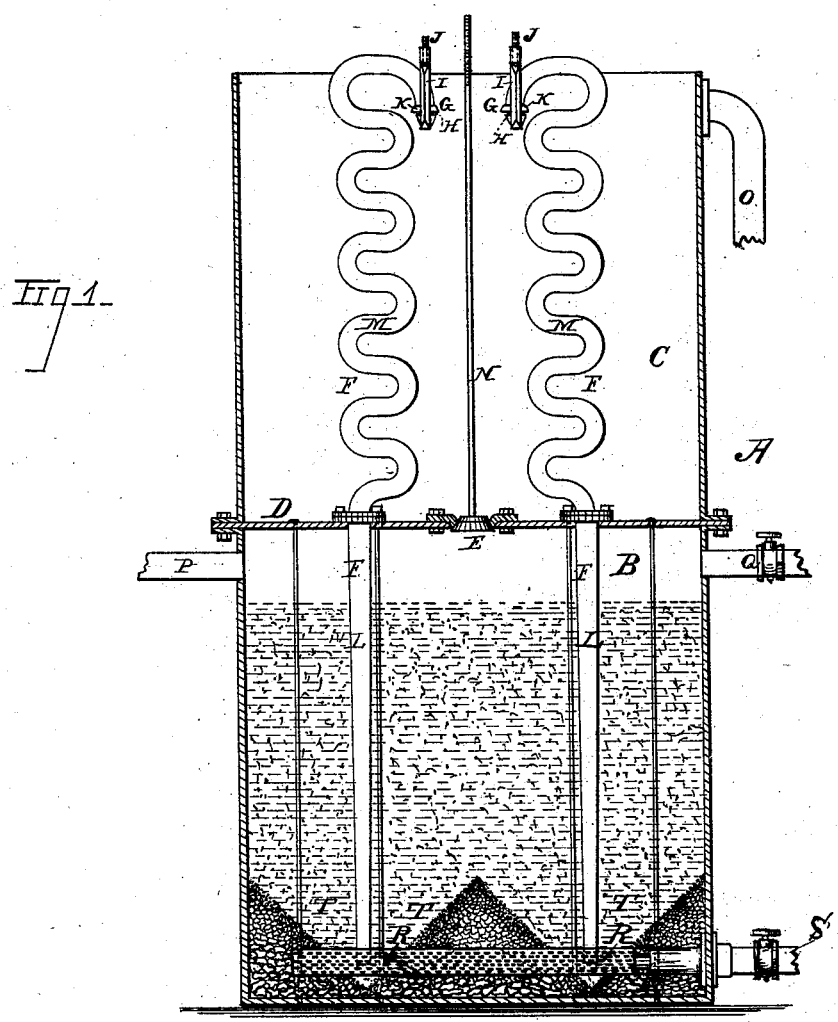
Figure 2:
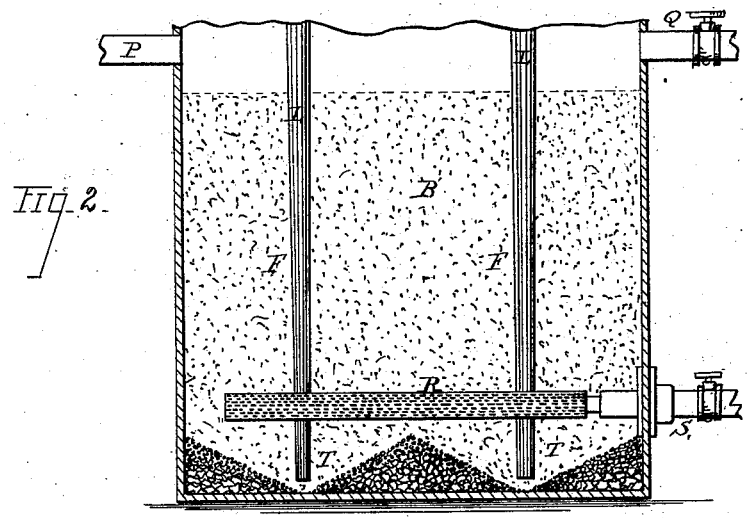
Figure 3:
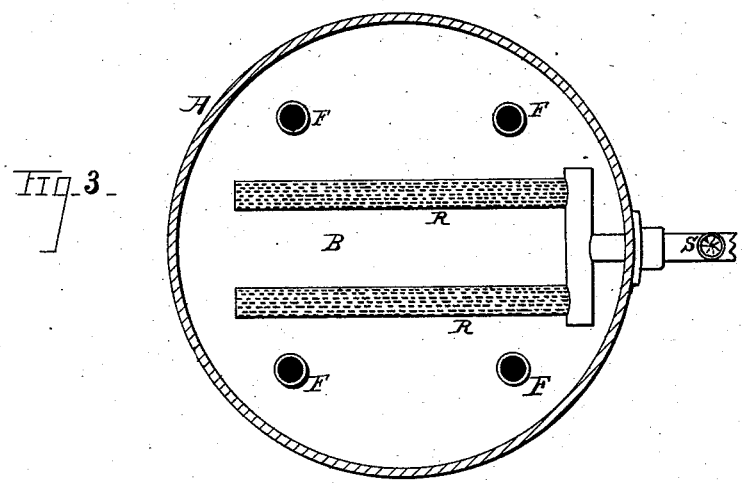
Figure 4:
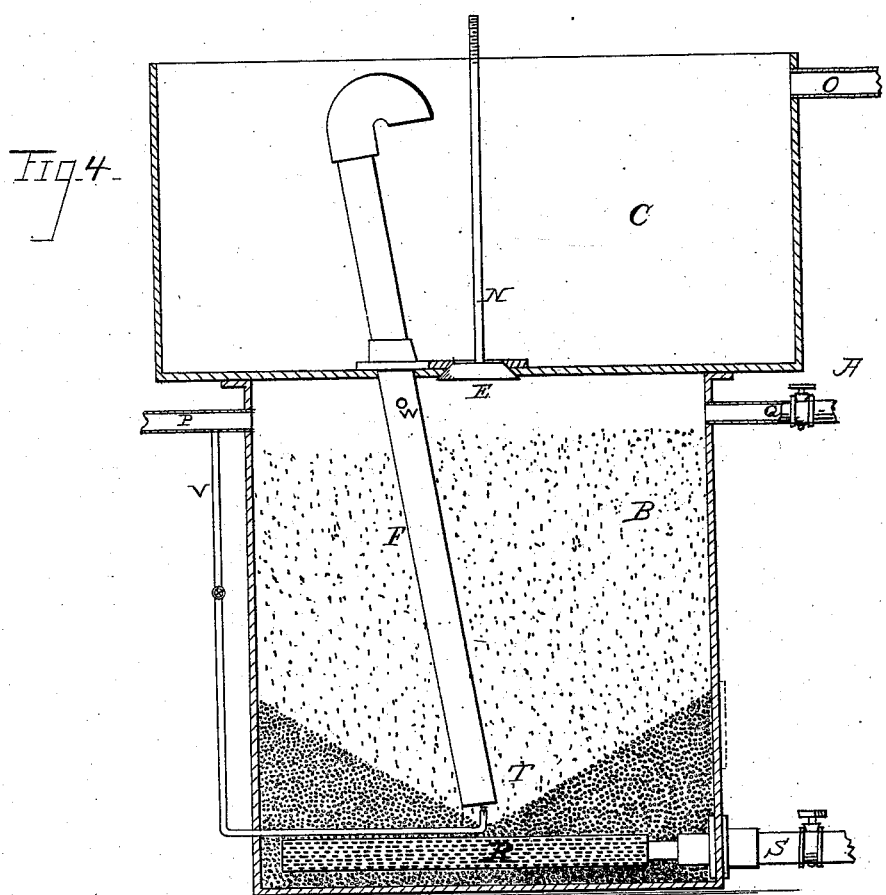

Figure 1 is a central vertical section of an apparatus embodying the elements of my invention. Fig. 2 is a similar view of a modified arrangement of the outlet-tube and conical formations in the lower compartment of the apparatus. Fig. 3 is a transverse section, showing the outlet-tubes. Fig. 4 is a vertical section of a modified form of filter. Fig. 5 is an enlarged vertical section, and Fig. 6 is a front end view, of the rubber ball-valve used in connection with the pipe M.

Referring to the drawings, A denotes the filter, consisting of the lower and upper compartments, (lettered B C, respectively,) separated by a horizontal partition or diaphragm, D, and supplied with suitable inlets and outlets, as hereinafter specified. The upper compartment, C, is of suitable size to receive the bed of filtering agent from the lower compartment, B, during the process of washing the same, and is connected with the said lower compartment by a central valve, E, in the diaphragm D, and by one or more transfer washing-pipes, F. The lower ends of these pipes terminate at a point adjacent to the base of the filter, while their upper ends extend to the upper part of the compartment C, and are supplied with rubber ball-valves G, which consist of the ball H, fitting against the inner edges of the outlet from the pipes, and the yoke I, which carries the ball H, and is adjustable with relation to the outlet by a set-screw, J. The outlet from the transfer-pipes F projects downward, and is provided with the enlarged annular depending lip or flange K, which is removed from contact with the ball H, and permits the water and filtering substance to pass from the pipes F, when the ball H is lowered from its seat by the adjustment of the screw J, without splashing or flying out sidewise from the valve, the depending annular lip or flange K serving to direct the matter downward into the lower part of the compartment. The transfer-pipes F are made in two sections, L M, united by bolts at the diaphragm or partition D, as indicated, and the lower section, L, is preferably tapered, while the upper section, M, describes a serpentine line, as shown; or it may be of other irregular outline, the purpose being to provide a surface against which the filtering substance must move while being transferred from the lower to the upper compartment in the process of washing the same, and which will induce a thorough and constant abrasion of the particles in transit, and effectually remove thereby all impurities, &c., from the surface thereof. In many cases the serpentine section M may be discarded and a plain tube used instead with entirely satisfactory results; but I have found that there are certain kinds of impurities in some liquids which cling so closely to the elements of the filter-bed that they can be removed only with great difficulty, and I have satisfactorily determined that by the employment of the serpentine section M, I am able to secure sufficient agitation and abrasion of the particles of the filter-bed to detach all foreign matter therefrom. The effect of this part of the invention when applied to a filter employing a bed of sand and coke will be explained hereinafter. The central valve, E, may be opened and closed by a rod, N, and from the upper compartment will lead a waste-pipe, O. The lower compartment or filter proper is connected with a suitable supply of water or other liquid by the inlet-pipe P, arranged adjacent to the lower surface of the diaphragm D, and at the opposite side of the filter, from and about on a horizontal line with the inlet, is provided a waste-outlet, Q. In the lower part of the compartment B is applied the escape for purified liquid, which consists, in the present instance, of a tube or tubes of perforated metal, R, connected with a delivery, S. Any suitable number of the tubes R may be employed, according to the size of the apparatus. Upon the base of the filter are arranged the inverted cone-shaped formations T, the point or apex of which will be directly below the lower ends of the transfer washing-pipes F, and the sides or walls of which cone-shaped formations will incline toward the pipes F as a central point. The cone formations T may be constructed in various ways. In the present instance, however, they are composed of cobble-stone and gravel, the coarse stone being at the bottom. These are arranged after the filter is put up, and will retain their place merely by their own specific gravity; or the stone may be cemented in place. It is obvious, of course, that the cones T may be made in a multitude of ways, and I do not, therefore, confine myself to the employment of cobble-stone and gravel. In Fig. 1 the cone formations are built over and around the tube or tubes R, and their nature is such as to permit the passage of the liquid through them into the tubes; but, as illustrated in Fig. 2, the outlet-tubes R may be arranged on a line above the cone formations without at all detracting from the efficiency of the apparatus. The filter-bed will be placed upon the cone-shaped formations T, the purpose of which is to direct the elements of the bed during the transfer of the same to the upper compartment to the mouth of the pipes F. It is plain that if the base of the filter had a flat surface, all of the elements of the bed would not be sufficiently near the mouth of the transfer-pipes to be carried by the water into the same; but with the employment of a cone-shaped formation for each transfer-pipe all the particles of the filter-bed will be directed to the mouth of the pipes and be conveniently transferred to the upper compartment.

The filter above described is adapted for use in connection with a filter-bed of comminuted material of any suitable character. A bed of sand for most kinds of water would probably give entirely satisfactory results; but there are waters from certain localities which contain impurities of such nature that their removal is attended with great difficulties, and my aim has been to properly purify these waters, which has been accomplished by the employment of a bed of filtering agent composed of about equal parts of sand and coke or equivalent substance comminuted to about the size of coarse wheat, more or less, according to the condition of the water. The sand and coke or equivalent substances, after being intimately mixed, will be placed in the apparatus, and if clean the operation of filtering proceeded with by closing the valves G and E and the waste-outlet Q, and opening the inlet-pipe P and outlet for purified water, R S. The liquid passing downward through the filter-bed will be cleaned in transit, and will escape into the outlet S. The nature of the combined elements—sand and coke—under the conditions specified, is such that the foreign matter, no matter how intimately connected with the water, is effectually removed. When the filter-bed has become foul from the arrestation of silt and other matter, it may be washed by closing the outlets Q S and transferring the same by means of a current of water through the pipes F to the upper compartment, substantially as described in Letters Patent of the United States granted to me March 6, 1883, and numbered 273,542. The great abrasion of the particles passing through the serpentine pipe M has the effect of causing the sand (the harder substance) to grind off the surface of the particles of the coke, and thus detach the foreign matter therefrom. This would be true whether the pipe M was straight or bent; but it is true to a much greater extent in the latter instance.

In Fig. 4 I illustrate the invention embodied in a filter employing a single transfer-pipe, E, and, in addition to the elements shown in Fig. 1, I apply in this filter a pipe, V, leading from the inlet-pipe P to a point directly below the transfer-pipe F, and provide, also, an aperture or apertures, W, in the said transfer-pipe above the upper plane of the filter-bed. The purpose of both the pipe V and aperture W is to facilitate the passage of the elements of the filter-bed and the water through the pipe F. The pipe V issues a jet directly into the mouth of the pipe F, and assists in creating an upward current of the elements, while the aperture W permits the entrance of water from the filter into the pipe F, and the sand and other elements are loosened, and their passage facilitated thereby. The elements of the filter-bed and the water passing through the pipe F are of about a semi-liquid consistency, and their movement during the transfer is so rapid that the solid particles have no time to settle before they are ejected from the upper end of the pipe. Of course, the more water that passes with the solid particles the greater is the readiness of flow; and for this reason I provide the aperture W in the pipe F, since an additional quantity of water may pass through it into said pipe, and thus facilitate the transfer of the filtering substance, as aforesaid. The supplemental pipe V, provided with a check-valve, a, induces in part a current of the elements constituting the filter-bed upward through the pipe F, owing to the fact that the greater influx of water into and about the lower end of the pipe F the more readily will the filtering elements become loosened and move into the pipe.

The inverted-cone-shaped space T (illustrated in Fig. 4) is composed entirely of gravel, of a size that would pass through a sieve having a quarter-inch mesh, but which would not enter the perforated cylinder R, the perforations being about one-eighth of an inch in size. I form the inverted-cone-shaped space T by filling about, say, one-third of the compartment B with the gravel, and then, by water-pressure, discharge such as will leave the compartment B upward through the pipe F. The gravel remaining in the compartment will settle by its own specific gravity into the inclined walls forming the space T, and will serve effectually to support the bed of filtering agent, and permit the passage of the water to the perforated cylinder R.

What I claim as my invention, and desire to secure by Letters Patent, is—

1. A filter consisting of compartments, one having inlet and outlet ports and containing a bed of filtering substance, and being connected with another compartment by a transfer washing pipe or pipes arranged within the filter, substantially as set forth.

2. A filter consisting of compartments, one having inlet and outlet ports and containing a bed of filtering substance, and being connected with another compartment by a transfer washing pipe or pipes, cone-shaped formations being provided upon the base of the filter, to direct the elements of the filter-bed to the mouth of the transfer pipe or pipes during the process of washing the same, substantially as set forth.

3. A filter consisting of compartments provided with suitable inlet and outlet ports, one of the compartments containing a bed of filtering substance, and being connected with the adjacent compartment by a transfer washing pipe or pipes, and provided upon its base with cone-shaped formations composed of coarse and finer stone or gravel, substantially as set forth.

4. A filter consisting of compartments, one containing a bed of filtering substance, and being connected with the other compartment by a transfer pipe or pipes, that portion of same outside of the compartment containing the filtering substance being bent into a serpentine coil, substantially in the manner and for the purposes expressed.

5. A filter consisting of compartments, one containing a bed of filtering substance, and being connected with the other by a transfer pipe or pipes arranged within the filter, the pipe in the compartment containing the filter-bed being tapered, and that within the other compartment being coiled or bent, substantially as and for the purpose set forth.

6. A filter consisting of compartments connected by one or more transfer washing-pipes arranged within the filter, a portion of the pipe being formed into a serpentine coil, substantially as set forth.

Signed at New York, in the county of New York and State of New York, this 21st day of July, A. D. 1883.

JOHN W. HYATT.

Witnesses:
 CHAS. C. GILL,
 HERMAN GUSTOW.